(12) United States Patent
So et al.

(10) Patent No.: US 9,807,773 B2
(45) Date of Patent: Oct. 31, 2017

(54) TIER-BASED ADMISSION CONTROL FOR USER EQUIPMENT

(71) Applicant: Verizon Patent and Licensing Inc., Basking Ridge, NJ (US)

(72) Inventors: Raymond So, San Ramon, CA (US); Maria G. Lam, Oakland, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 157 days.

(21) Appl. No.: 13/969,734

(22) Filed: Aug. 19, 2013

(65) Prior Publication Data

US 2015/0049606 A1 Feb. 19, 2015

(51) Int. Cl.
*H04W 28/02* (2009.01)
*H04W 72/04* (2009.01)
*H04L 12/927* (2013.01)
*H04L 12/801* (2013.01)
*H04W 28/26* (2009.01)
*H04L 12/911* (2013.01)

(52) U.S. Cl.
CPC ......... *H04W 72/0486* (2013.01); *H04L 47/11* (2013.01); *H04L 47/808* (2013.01); *H04L 47/822* (2013.01); *H04W 28/26* (2013.01); *H04W 72/0413* (2013.01)

(58) Field of Classification Search
None
See application file for complete search history.

(56) References Cited

U.S. PATENT DOCUMENTS

| 8,953,443 | B2* | 2/2015 | Yang | H04L 47/127 370/230 |
| 8,976,685 | B1* | 3/2015 | Venizelos | H04W 8/18 370/252 |
| 2006/0135172 | A1* | 6/2006 | Dronne | H04L 47/10 455/452.2 |
| 2008/0037463 | A1* | 2/2008 | Gopal | H04W 28/18 370/328 |
| 2012/0250509 | A1* | 10/2012 | Leung et al. | 370/235 |
| 2015/0009826 | A1* | 1/2015 | Ma et al. | 370/235 |

* cited by examiner

*Primary Examiner* — Charles C Jiang
*Assistant Examiner* — Sori Aga (57) ABSTRACT

A device may receive information associated with a network resource request. The network resource request may be a request, by a user device, for access to a network resource associated with a network. The device may determine a subscriber class associated with the user device based on receiving the information associated with the network resource request. The device may determine a service type associated with the network resource request based on receiving the information associated with the network resource request. The device may determine an allocation and retention priority (ARP) level based on the determined subscriber class and the determined service type. The device may assign the ARP level to the network resource.

20 Claims, 9 Drawing Sheets

TIER-BASED ADMISSION CONTROL FOR USER EQUIPMENT

BACKGROUND

User devices, such as smart phones, may be allocated network resources. During periods of network congestion, network resources may be limited. An allocation and retention priority ("ARP") parameter may be used to control congestion by differentiating users based on a priority level.

DETAILED DESCRIPTION OF PREFERRED EMBODIMENTS

The following detailed description of example implementations refers to the accompanying drawings. The same reference numbers in different drawings may identify the same or similar elements.

A radio access network ("RAN") provider may reserve radio resources, such as resources associated with a long term evolution ("LTE") network, a code division multiple access ("CDMA") network, or the like, for use during periods of network congestion. The network provider may differentiate a resource request based on assignment of a priority parameter, such as an allocation and retention priority ("ARP") level. An ARP level may be associated with one or more Quality of Service ("QoS") parameters (e.g., one or more parameters associated with treatment of a traffic flow). A higher ARP level (e.g., level 1) may be associated with a more preferred status than a lower ARP level (e.g., level 9) during allocation of bearers when the network is congested.

However, the RAN provider may wish to exercise more granular control for congestion management by allowing access and assigning more resources to a preferred subscriber class of users (e.g., associated with user devices). Tier-based network resource allocation may be used to provide preferential access to a network resource based on user subscription priority (e.g., a subscriber class), and may provide greater granularity of control during network congestion. Implementations described herein may assist a base station in managing the allocation of network resources during periods of network congestion based on a user's subscription class, retention capabilities, and/or network congestion levels.

Figure 1:
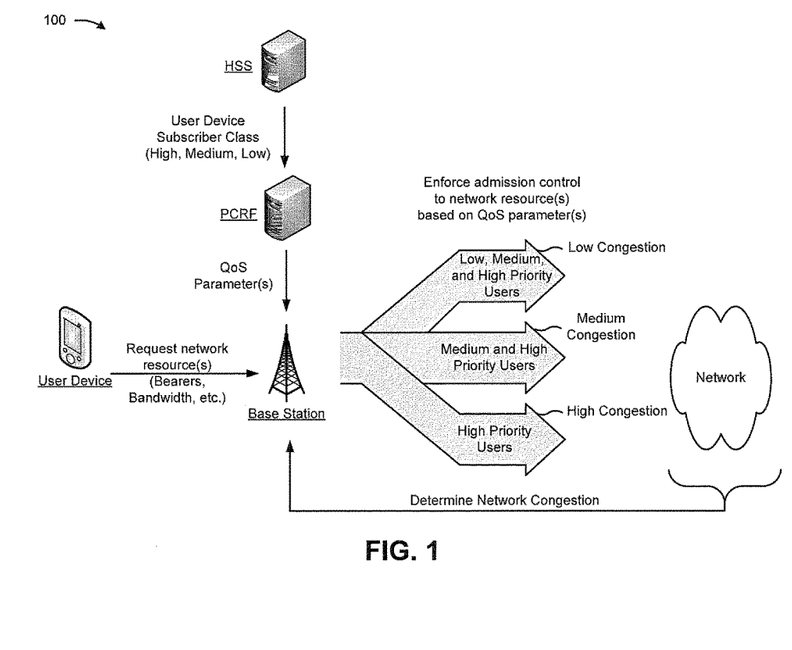
FIG. 1 is a diagram of an overview of an example implementation described herein.

FIG. 1 is a diagram of an overview of an example implementation 100 described herein. As shown in FIG. 1, example implementation 100 may include a user device, a base station, a policy and charging rules function device ("PCRF"), a home subscriber server ("HSS"), and a network. For example implementation 100, the user device may include a mobile phone, the base station may include an eNodeB ("eNB"), the PCRF may include one or more servers, the HSS may include one or more servers, and the network may include an LTE network.

As shown in FIG. 1, the base station may receive a request from the user device to be allocated one or more network resources associated with the network. For example, the base station may receive a request for a quantity of bearers (e.g., with a particular resource allocation, such as a guaranteed bit rate ("GBR") resource allocation, a non-guaranteed bit rate ("non-GBR") resource allocation, a physical resource block resource allocation, a connection resource allocation, or the like) to handle network traffic of a particular service type, such as voice traffic, mobile internet traffic, short message service ("SMS") traffic, multimedia messaging service ("MMS") traffic, or the like. The base station may determine a network congestion level (e.g., a utilization level) associated with the network, and may determine to process the network resource request from the user device using tier-based admission control procedures, as described herein.

As further shown in FIG. 1, the PCRF may be notified (e.g., by the base station) of the resource request and/or the service type requested by the user device, and may receive subscriber class information (e.g., high, medium, low), associated with the user device, from the HSS. The PCRF may assign, to the network resource (e.g., the bearer) requested by the user device, one or more quality of service ("QoS") parameters (e.g., an ARP level, a pre-emption capability, a pre-emption vulnerability, a QoS Class Indicator ("QCI") value, etc.) based on the subscriber class associated with the user device and/or the service type requested by the user device. For example, a high subscriber class user device may receive a high priority ARP level and a low subscriber class user device may receive a low priority ARP level.

As further shown in FIG. 1, the PCRF may provide the one or more QoS parameters to the base station. The base station may configure admission control based on the QoS parameters (e.g., the ARP level), the service type, and/or the network congestion level. For example, assuming a congested network, the base station may allocate a requested quantity of network resources (e.g., physical resource blocks for GBR resources) to a bearer that has been assigned a high priority ARP level; may allocate a requested quantity of network resources to a bearer that has been assigned a medium priority ARP level; and may bar a bearer that has been assigned a low priority ARP level from accessing any network resources. In this way, the base station may manage service during network congestion by reserving network resources for premium users during periods of network congestion.

Figure 2:
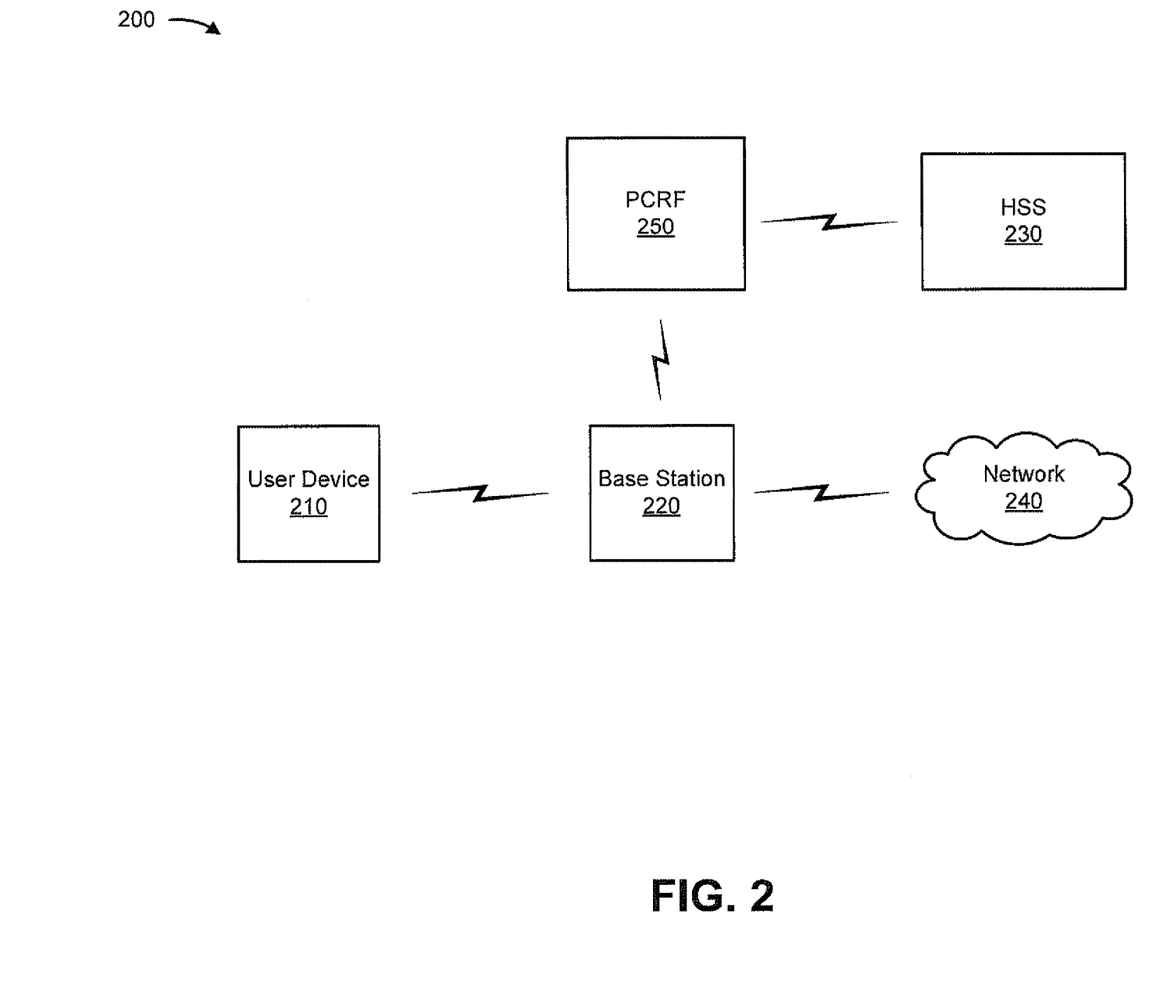
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a base station 220, a home subscriber server ("HSS") 230, a network 240, and a policy and charging rules function ("PCRF") 250. Devices of environment 200 may interconnect via wired connections, wireless connections, or a combination of wired and wireless connections.

User device 210 may include one or more devices capable of connecting to a network, such as network 240 (e.g., via base station 220), and utilizing a network resource, such as one or more bearers. For example, user device 210 may include a mobile phone (e.g., a smart phone), a radiotelephone, a personal communications system ("PCS") terminal (e.g., that may combine a cellular radiotelephone with data processing and data communications capabilities), a personal digital assistant ("PDA") (e.g., that may include a radiotelephone, a pager, Internet/intranet access, etc.), a computer (e.g., a desktop computer, a laptop computer, a tablet computer, etc.), a personal gaming system, and/or another similar type of device. In some implementations, user device 210 may send, to base station 220, information that identifies user device 210, information that identifies a service type requested by user device 210, information that identifies a network resource requested by user device 210, or the like.

Base station 220 may include one or more devices capable of receiving, generating, processing, storing, and/or transmitting network traffic, such as media, audio, video, text, and/or other traffic, destined for and/or received from user device 210. In some implementations, base station 220 may include an eNodeB associated with an LTE network that receives traffic from and/or sends traffic to network 240 via a packet data network gateway and/or a serving gateway. Additionally, or alternatively, one or more base stations 220 may be associated with a RAN other than an LTE network. For example, base station 220 may be associated with a CDMA evolution data-optimized ("EV-DO") network, a CDMA 1× radio transmission technology ("RTT") network, a Wi-Fi network, a WiMax network, or the like. Base station 220 may send traffic to and/or receive traffic from user device 210 via an air interface. In some implementations, base station 220 may receive information, from PCRF 250, identifying a QoS parameter, such as an ARP level, associated with a network resource, such as a bearer, requested by user device 210.

HSS 230 may include one or more devices capable of receiving, generating, processing, storing, and/or providing subscriber information, such as a user identifier, authentication and/or authorization information, a user's internet protocol ("IP") information, subscriber class information associated with user device 210, or the like. For example, HSS 230 may include a user profile server function ("UPSF"), a home location register ("HLR"), an authentication center ("AuC"), a server, or the like. HSS 230 may transmit subscriber class information to PCRF 250 via network 240, in some implementations.

Network 240 may include one or more wired and/or wireless networks. For example, network 240 may include a cellular network, a public land mobile network ("PLMN"), a first generation ("1G") network, a second generation ("2G") network, a third generation ("3G") network, a fourth generation ("4G") network, a fifth generation ("5G") network, a CDMA one times transmission ("1×") network, a CDMA EV-DO network, an LTE network, and/or another network. Additionally, or alternatively, network 240 may include a Wi-Fi network, a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

PCRF 250 may include one or more network devices capable of providing network control regarding service data flow detection, gating, QoS, and/or flow-based charging. Policies and rules regarding QoS may include policies and rules instructing user device 210 and/or base station 220 to minimize packet loss, to implement a packet delay budget, to provide a guaranteed bit rate (GBR) service, to provide a non-guaranteed bit rate (non-GBR) service, to provide a particular latency, and/or to perform other activities associated with QoS. PCRF 250 may provide policies and rules to other network devices, such as base station 220, HSS 230, or the like, to implement network control. PCRF 250 may determine how a certain service data flow shall be treated within a bearer, and may ensure that QoS is in accordance with a user's profile and/or network policies. PCRF 250 may determine one or more QoS parameters (e.g., an ARP level, a QCI value, etc.) based on a subscriber class and/or a service type associated with user device 210, and may assign the QoS parameters to a network resource.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
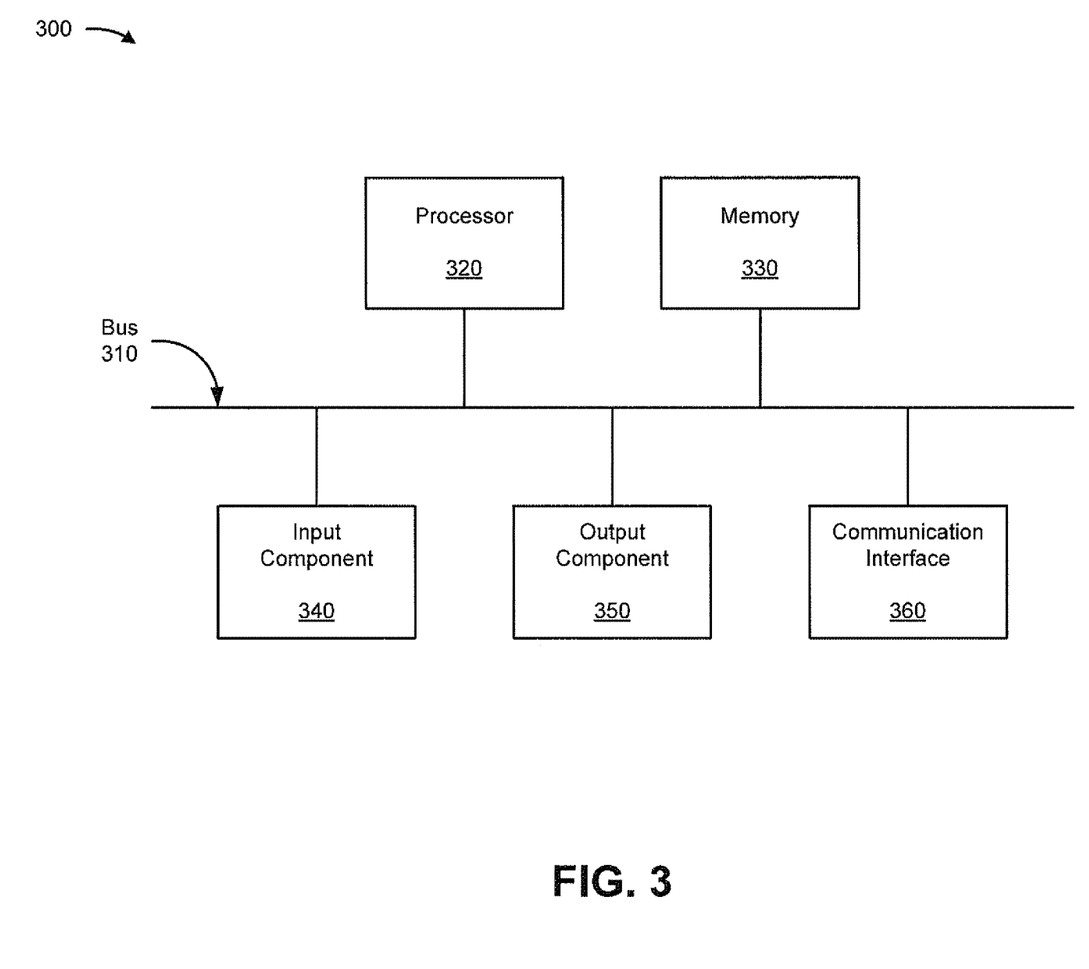
FIG. 3 is a diagram of example components of one or more devices of FIG. 2.

FIG. 3 is a diagram of example components of a device 300. Device 300 may correspond to user device 210, base station 220, HSS 230, and/or PCRF 250. Additionally, or alternatively, each of user device 210, base station 220, HSS 230, and/or PCRF 250 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
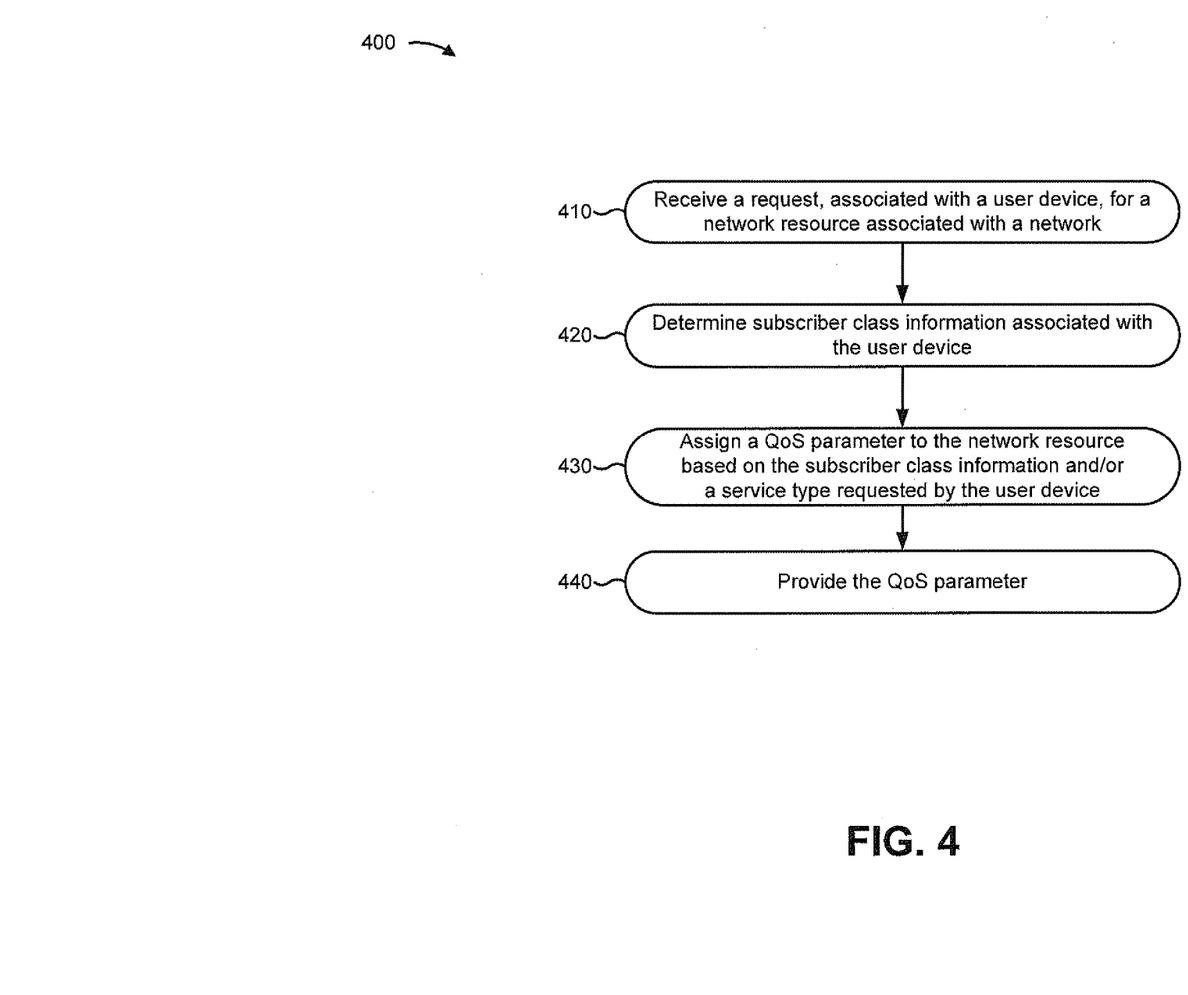
FIG. 4 is a flow chart of an example process for assigning a Quality of Service (QoS) parameter to a requested network resource based on a subscriber class associated with a user device requesting the network resource.

FIG. 4 is a flow chart of an example process 400 for assigning a Quality of Service parameter to a requested network resource based on a subscriber class associated with a user device requesting the network resource. In some implementations, one or more process blocks of FIG. 4 may be performed by PCRF 250. Additionally, or alternatively, one or more process blocks of FIG. 4 may be performed by another device or a group of devices separate from or including PCRF 250, such as base station 220 and/or HSS 230.

As shown in FIG. 4, process 400 may include receiving a request, associated with a user device, for a network resource associated with a network (block 410). For example, base station 220 may receive a request from user device 210 to be allocated a network resource associated with network 240, and may provide information associated with the resource request to PCRF 250. In some implementations, the network resource may include a radio capacity resource, a radio access bearer, guaranteed bit rate ("GBR") bandwidth, non-guaranteed bit rate ("non-GBR") bandwidth, a connection resource, or the like.

The request for a network resource may include information associated with determining a QoS parameter for the requested network resource. A QoS parameter may include, for example, an ARP level, a GBR parameter, a non-GBR parameter, a pre-emption capability, a pre-emption vulnerability, a QoS Class Indicator ("QCI") value, or the like. For example, PCRF 250 may receive (e.g., from base station 220) a user device identifier that identifies a user device 210 requesting the network resource (e.g., an international mobile subscriber identity ("IMSI"), a mobile equipment identifier ("MEID"), a telephone number, or the like). Additionally, or alternatively, PCRF 250 may receive (e.g., from base station 220) information that identifies a service type requested by a user device 210 requesting the network resource. A service type may include, for example, an internet service, a voice service, a video service, a messaging service, etc.

As further shown in FIG. 4, process 400 may include determining subscriber class information associated with the user device (block 420). For example, PCRF 250 may receive subscriber class information from HSS 230, in some implementations. A subscriber class may include a classification (e.g., high or low; high, medium, or low; high, medium high, medium, medium low, or low; etc.) of user device 210 that may correlate to the preferentiality of user device 210 in being granted network resources by base station 220. In some implementations, PCRF 250 may transmit a user device identifier to HSS 230, and HSS 230 may determine subscriber class information based on the user device identifier (e.g., by searching a data structure). HSS 230 may transmit the subscriber class information to PCRF 250. Additionally, or alternatively, PCRF 250 may search a data structure for the subscriber class information (e.g., using the user device identifier).

As further shown in FIG. 4, process 400 may include assigning a QoS parameter to the network resource based on the subscriber class information and/or a service type requested by the user device (block 430). For example, PCRF 250 may assign a QoS parameter indicating a high preferentiality in receiving network resources to the network resource request by user device 210 when user device 210 is associated with a high subscriber class. A QoS parameter may include a QoS class indicator ("QCI") value, an ARP parameter value (e.g., an ARP value indicative of an ARP level), a guaranteed bit rate ("GBR") parameter value, a non-guaranteed bit rate ("non-GBR") parameter value, a maximum bit rate ("MBR") parameter value, or the like.

PCRF 250 may map one or more subscriber classes to one or more ARP parameter values, in some implementations. For example, when ARP parameter values range from 1 to 15 (e.g., with 1 being the highest priority value), PCRF 250 may reserve ARP parameter values 1 and 2 for special uses (e.g., an emergency use, a testing use, etc.), may assign ARP parameter values 3 and 4 to high priority subscribers, may assign ARP parameter values 5 and 6 to medium priority subscribers, may assign ARP parameter values 7 and 8 to low priority subscribers, and may assign ARP parameter values 9 to 15 for regular traffic flow use by general users and/or low priority service types (e.g., low priority applications).

PCRF 250 may assign a QoS parameter to a network resource based on a service type requested by a user device, in some implementations. For example, network resources associated with different service types (e.g., internet services, enterprise/business services, peer-to-peer services, voice services, video services, gaming services, interactive services, etc.) may be assigned different QoS parameters.

As further shown in FIG. 4, process 400 may include providing the QoS parameter (block 440). For example, PCRF 250 may bind the QoS parameter to a network resource requested by user device 210. In some implementations, PCRF 250 may provide information identifying the QoS parameter to devices of network 240 (e.g., base station 220, a packet data network gateway ("PGW"), a serving gateway ("SGW"), a mobility management entity ("MME"), a policy and charging enforcement function ("PCEF"), or the like). For example, PCRF 250 may provide information that identifies the QoS parameter to base station 220 for use in admission control.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

Figure 5A:
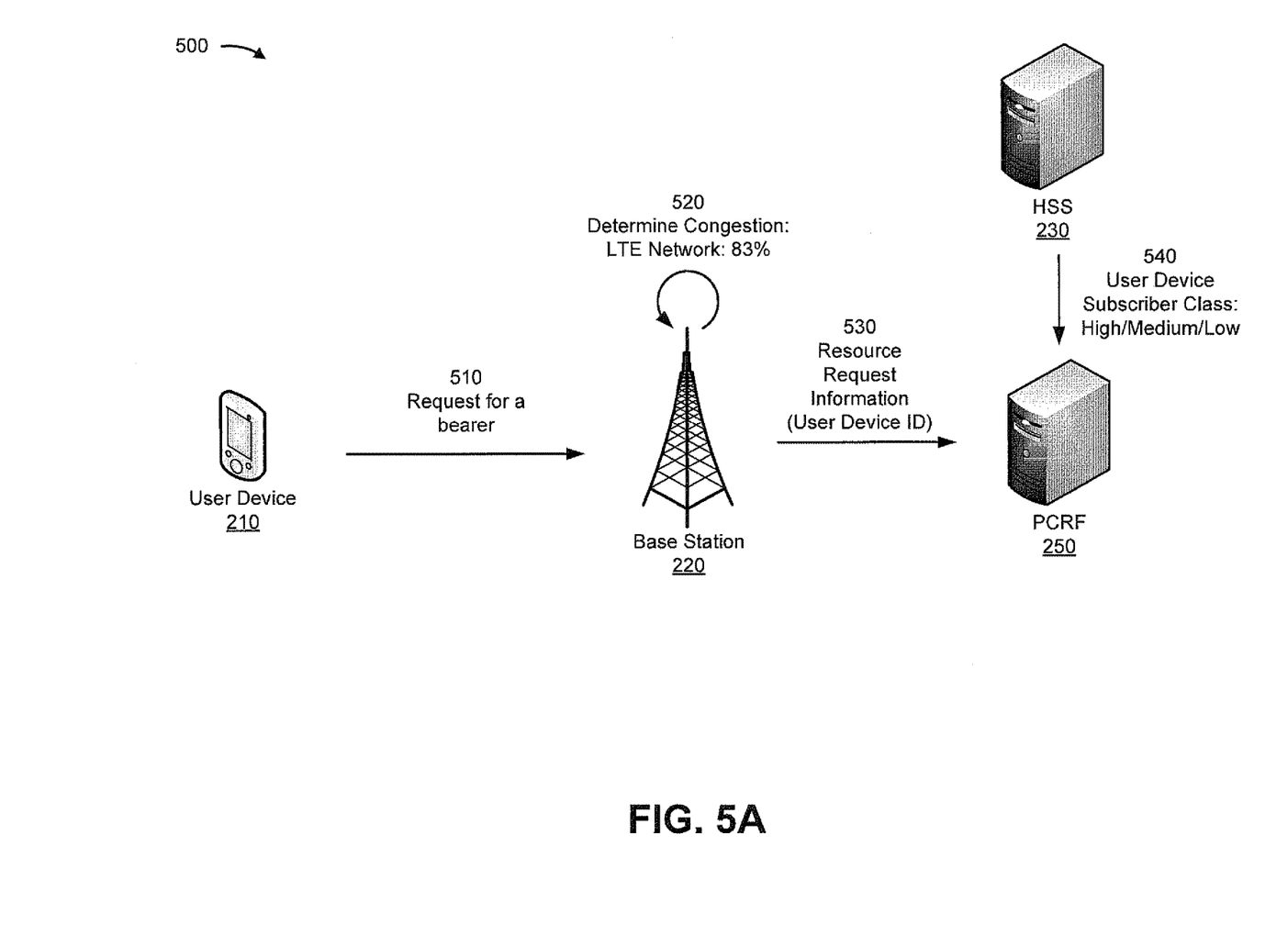
FIGS. 5A and 5B are diagrams of an example implementation relating to the example process shown in FIG. 4.

FIGS. 5A and 5B are diagrams of an example implementation 500 relating to process 400 shown in FIG. 4. As shown in FIG. 5A, and by reference number 510, assume that base station 220 receives a request for a bearer, from user device 210. As shown by reference number 520, base station 220 determines a network congestion level associated with network 240, an LTE network. For example, assume that base station 220 determines network congestion to be 83% for network 240. Assume that because the 83% network congestion level associated with network 240 exceeds a threshold level of 80%, network 240 is congested (e.g., above 80%). As shown by reference number 530, base station 220 provides resource request information (e.g., information identifying the requested resource and/or user device 210) to PCRF 250. As shown by reference number 540, PCRF 250 receives subscriber class information from HSS 230 (e.g., based on providing a user device identifier to HSS 230). For example, user device 210 may be identified as having a subscriber class of high, medium, or low.

Figure 5B:
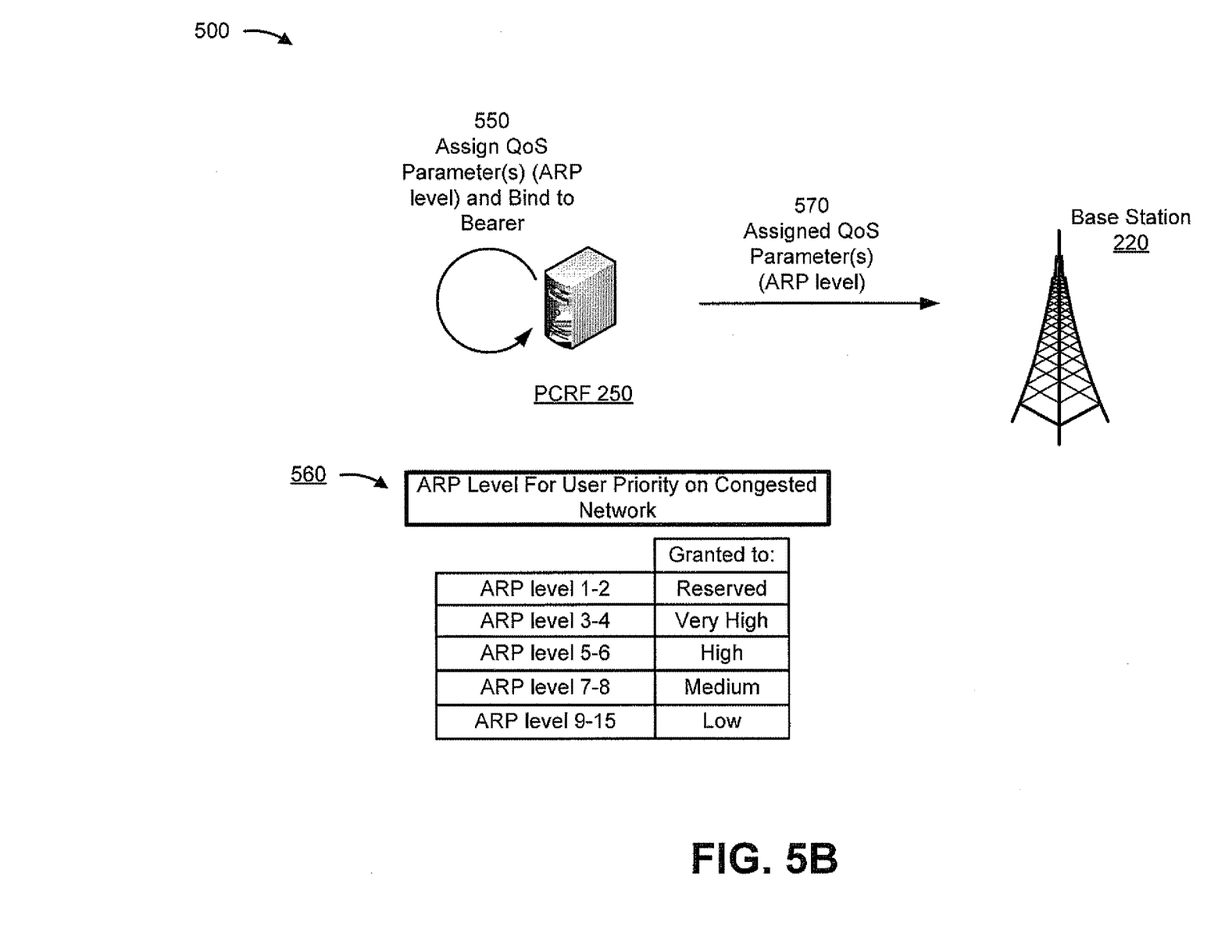

As shown in FIG. 5B, and by reference number 550, PCRF 250 determines one or more QoS parameters (e.g., an ARP level) to assign to the bearer requested by user device 210, and binds the QoS parameters (e.g., the ARP level, a QCI value, a data rate control, etc.) to the bearer. PCRF 250 assigns the ARP level based on a pre-configured determination, as shown by reference number 560. Assume that ARP levels 1 and 2 are reserved for allocation based on factors other than subscriber class (e.g., emergency service personnel, network testing, etc.), and further assume that ARP levels 9-15 are reserved for traffic from customers lacking a subscriber class and/or for low priority services. This allocation of ARP levels is provided as an example, and other allocations are possible.

As an example, assuming that user device 210 is a very high priority user device, user device 210 may be assigned an ARP level of 3 or 4. As another example, assuming that user device 210 is a high priority user device, user device 210 may be assigned an ARP level of 5 or 6. As another example, assuming that user device 210 is a medium priority user device, user device 210 may be assigned an ARP level of 7 or 8. As another example, assuming that user device 210 is a low priority user device, user device 210 may be assigned an ARP level between 9-15, inclusive. This assignment of ARP levels is provided as an example, and other assignments are possible.

As shown by reference number 570, PCRF 250 provides the assigned QoS parameters (e.g., information identifying the assigned ARP level) to base station 220. Base station 220 may use the QoS parameters when enforcing admission control, as described in more detail elsewhere herein.

As indicated above, FIGS. 5A and 5B are provided merely as an example. Other examples are possible and may differ from what was described with regard to FIGS. 5A and 5B.

Figure 6:
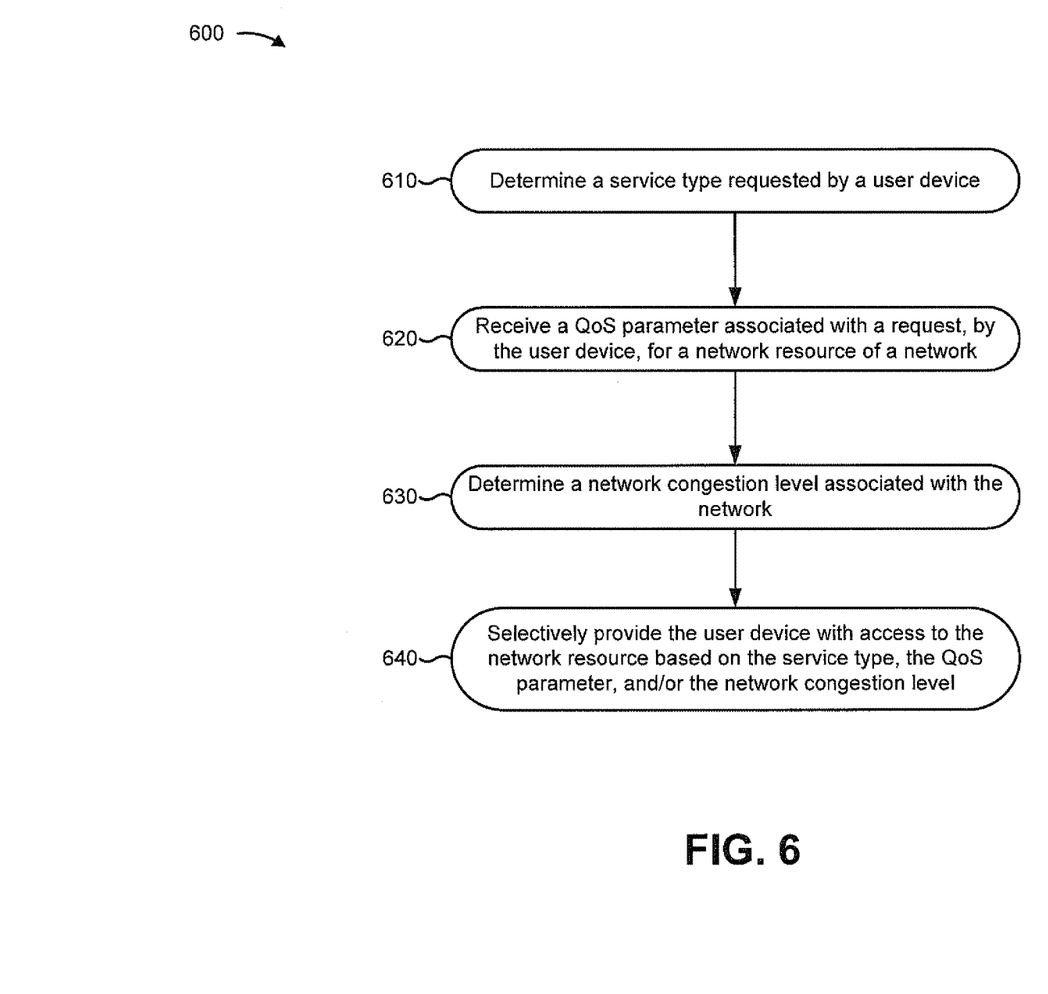
FIG. 6 is a flow chart of an example process for enforcing admission control to a network resource based on a service type requested by a user device, a Quality of Service parameter, and/or a network congestion level.

FIG. 6 is a flow chart of an example process 600 for enforcing admission control to a network resource based on a service type requested by a user device, a Quality of Service parameter, and/or a network congestion level. In some implementations, one or more process blocks of FIG. 6 may be performed by base station 220. Additionally, or alternatively, one or more process blocks of FIG. 6 may be performed by another device or a group of devices separate from or including base station 220, such as HSS 230 and/or PCRF 250.

As shown in FIG. 6, process 600 may include determining a service type requested by a user device (block 610). For example, base station 220 may receive information identifying a service type requested by user device 210. User device 210 may send information, to base station 220, requesting access to a network resource for a connection associated with a particular service type. The service type may include, for example, an internet service, an enterprise/business service, a peer-to-peer service, a voice service, a video service, a gaming service, and interactive service, or the like.

As shown in FIG. 6, process 600 may include receiving a QoS parameter associated with a request, by the user device, for a network resource of a network (block 620). For example, base station 220 may receive information identifying a QoS parameter associated with a request by user device 210 for a network resource (e.g., a bearer with a particular resource allocation). In some implementations, base station 220 may receive the QoS parameter from PCRF 250 for the service type requested by user device 210. For example, PCRF 250 may determine one or more QoS parameters (e.g., an ARP level and/or parameter value, a QCI value, a GBR parameter value, a non-GBR parameter value, an MBR parameter value, etc.) for the requested network resource, and may provide information identifying the one or more QoS parameters to base station 220 (e.g., on one or more bearers for providing the service).

As further shown in FIG. 6, process 600 may include determining a network congestion level associated with the network (block 630). For example, base station 220 may determine the network congestion level associated with network 240, and may determine that the network congestion level satisfies a threshold. In some implementations, the threshold may trigger usage of subscriber class information in determining access admission for a user device to a network. In some implementations, the network congestion level may be based on a measurable network resource. The measurable network resource may include a quantity of allocated bearers, a quantity of user devices 210 connected to the network and/or in communication with base station 220, a bandwidth capacity, a throughput rate, or the like. For example, base station 220 may determine the network congestion level associated with network 240 based on a percentage of bearers allocated out of a total quantity of available bearers.

The measurable network resource may be associated with a network resource requested by user device 210, in some implementations. For example, base station 220 may determine the threshold level at which network 240 may be considered congested, and the threshold level may be a utilization level of the requested resource. In some implementations, the measurable network resource may be different from the requested network resource.

Base station 220 may determine that the network congestion level satisfies the threshold based on a discrete quantity of the measurable network resource, in some implementations. For example, base station 220 may determine that network 240 is congested when a quantity of bearers have been allocated. Additionally, or alternatively, base station 220 may determine that network 240 is congested when a quantity of bearers remain available.

Base station 220 may determine that the network congestion level satisfies a threshold based on a percentage associated with the measurable network resources, in some implementations. For example, base station 220 may determine that network 240 is congested when a particular percentage of the maximum throughput rate is being achieved.

As further shown in FIG. 6, process 600 may include selectively providing the user device with access to the network resource based on the service type, the QoS parameter, and/or the network congestion level (block 640). For example, base station 220 may provide user device 210 with access to the network resource (e.g., associating one or more physical resource blocks with a requested bearer) based on the ARP level associated with the requested bearer. Additionally, or alternatively, base station 220 may remove user device 210 from the network (e.g., may disconnect, preempt, and/or remove access to the network resource). For example, when the network congestion level exceeds a threshold, base station 220 may enforce a QoS parameter (e.g., an ARP level) by denying access to the network resource by a low ARP level user device 210.

Base station 220 may determine whether to assign the network resource to user device 210 based on comparing the network congestion level to one or more admission thresholds, in some implementations. An admission threshold may be based on a percentage of radio capacity resources, a quantity of users, a quantity of bearers, or the like. For example, base station 220 may determine an admission threshold based on a percentage utilization of radio capacity. In this case, when base station 220 determines admission thresholds correlating to three subscriber classes (e.g., high, medium, and low; each subscriber class correlating to a range of ARP levels, such as the high subscriber class correlating to ARP levels 1-4, the medium subscriber class correlating to ARP levels 5-8, and the low subscriber class correlating to ARP levels 9-15), base station may assign the requested resource to user device 210 when the network congestion level satisfies a first admission threshold (e.g., is below the first admission threshold), and when user device 210 is determined to be of a high, medium, or low subscriber class.

Additionally, or alternatively, base station 220 may assign the requested resource to user device 210 when the network congestion level satisfies a second admission threshold (e.g., higher than the first admission threshold), and when user device 210 is determined to be of a high or medium subscriber class. Additionally, or alternatively, base station 220 may assign the requested resource to user device 210 when the network congestion level satisfies a third admission threshold (e.g., higher than the first and second admission thresholds), and when user device 210 is determined to be of a high subscriber class. In some implementations, user device 210 may bar all new user devices 210 from the network when the congestion level is beyond the third admission threshold.

A single admission threshold may apply to multiple subscriber classes, in some implementations. For example, base station 220 may determine that either a low or medium priority user device 210 (e.g., where PCRF 250 has assigned an ARP level to the resource request associated with user device 210 based on determining user device 210 to be of either a low or medium subscriber class) is to be denied requests for resource allocations when the network congestion level exceeds a single admission threshold.

Base station 220 may provide access to the network resource based on a service type, in some implementations. A service type may include, for example, an emergency call, a messaging service, a voice service, a video service, or the like. For example, base station 220 may determine that the request for the network resource is to be denied based on the ARP level and the network congestion level. In this case, base station 220 may determine that the service type is an emergency call, and may provide access to the network resource accordingly.

Base station 220 may provide access to the network resource when user device 210 is being handed-off from another base station, in some implementations. A hand-off may occur when user device 210 is moving from an area covered by a first base station 220 to an area covered by a second base station 220. In this case, the second base station 220 may afford treatment associated with a higher subscriber class (e.g., a higher ARP level) to user device 210 in order to avoid a service interruption (e.g., dropping a call).

Base station 220 may provide access to the network resource based on one or more access rules, in some implementations. An access rule may be a preset determination by base station 220 as to whether user device 210 is to be allocated network resources based on a given set of factors. For example, an access rule may determine whether to allocate network resources to user device 210 at a particular network congestion level, using a particular subscriber class, using a particular QoS parameter (e.g., an ARP level), for a particular service type, etc.

Although FIG. 6 shows example blocks of process 600, in some implementations, process 600 may include additional blocks, different blocks, fewer blocks, or differently arranged blocks than those depicted in FIG. 6. Additionally, or alternatively, two or more blocks of process 600 may be performed in parallel.

Figure 7A:
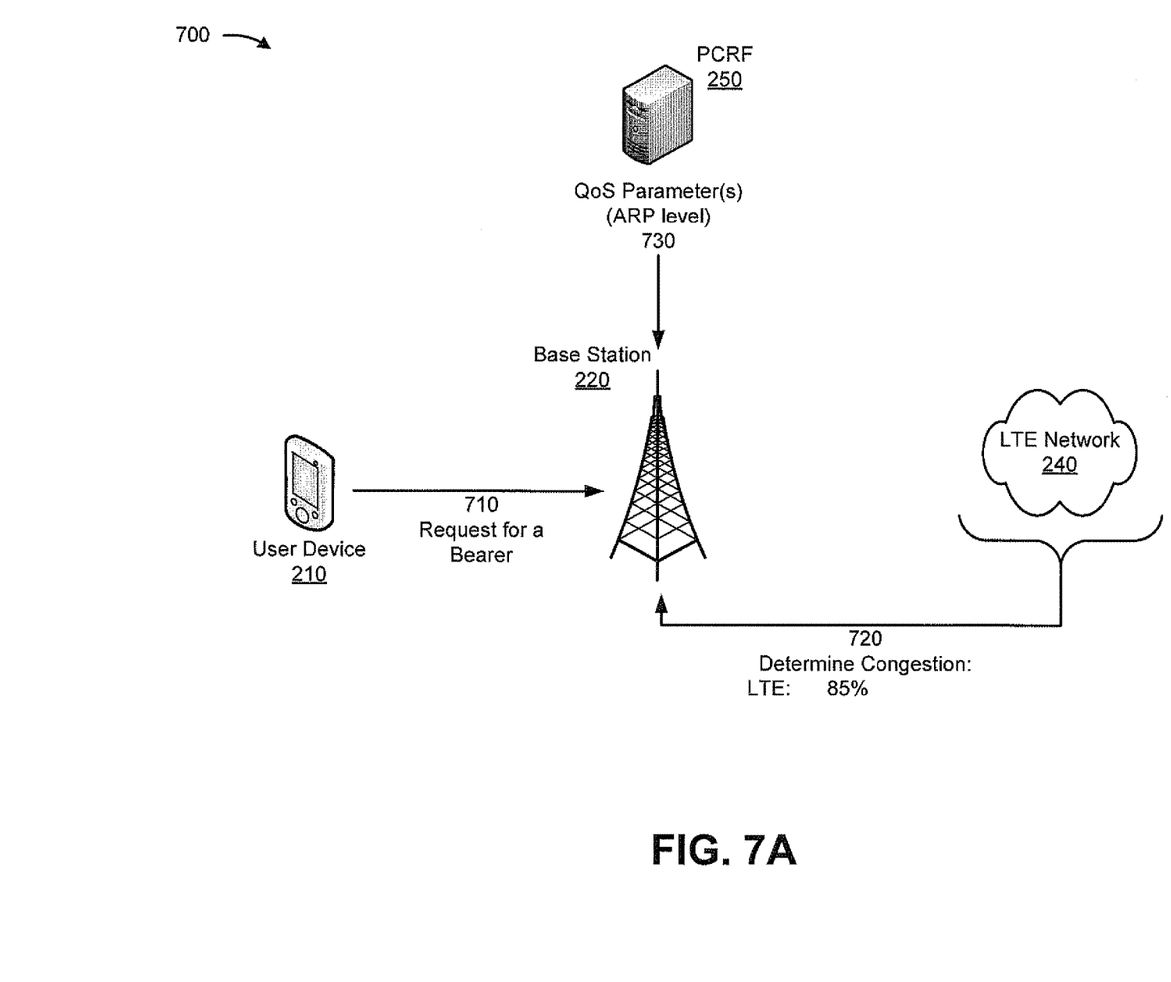
FIGS. 7A and 7B are diagrams of an example implementation relating to the example process shown in FIG. 6.

FIGS. 7A and 7B are diagrams of an example implementation 700 relating to process 600 shown in FIG. 6. As shown in FIG. 7A, and by reference number 710, user device 210 sends a request to establish a bearer (e.g., with access to a quantity of a network resource) to base station 220. As shown by reference number 720, base station 220 determines the network congestion level (e.g., 85%) associated with network 240 (e.g., an LTE network). As shown by reference number 730, base station 220 receives a QoS parameter (e.g., an ARP level) from PCRF 250, determined as discussed herein in connection with FIG. 4. Assume the QoS parameter includes an ARP level.

Figure 7B:
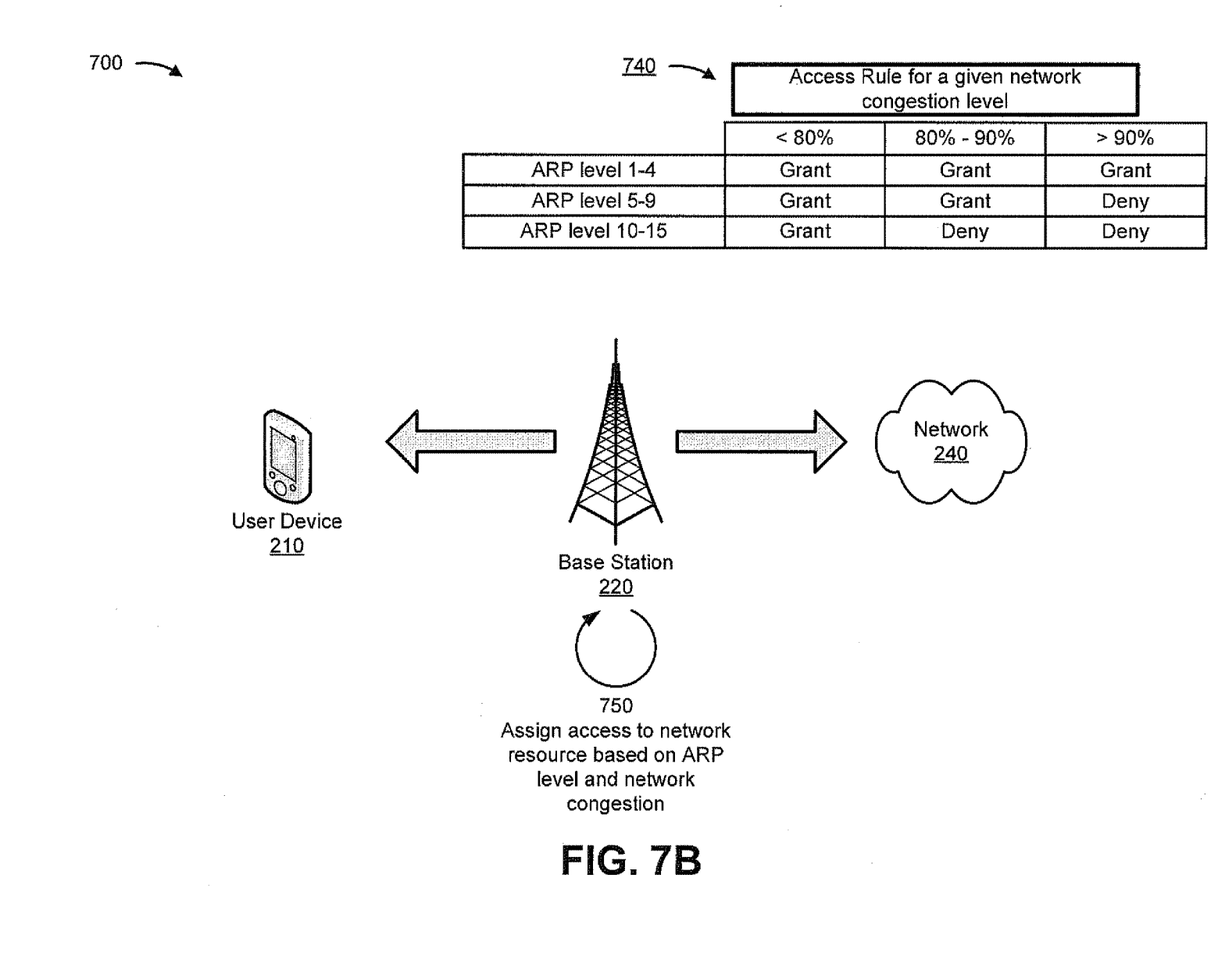

As shown in FIG. 7B, base station 220 stores access rule 740 (e.g., a set of pre-configured determinations to be used for determining whether to grant access to a particular network resource at a particular ARP level and a particular network congestion level). As shown by reference number 750, base station 220 assigns access to the network resource by comparing the ARP level associated with the network resource request and the network congestion level associated with network 240 against the pre-configured determinations. For example, based on the network congestion level of 85%, base station 220 would deny user device 210 access to the network resource (e.g., based on access rule 740) if PCRF 250 assigned an ARP of 10-15.

As another example, assuming that base station 220 had determined the network congestion level to be 95%, base station 220 would deny access to the network resource (e.g., based on access rule 740) if PCRF 250 had assigned an ARP of 5-15.

As indicated above, FIGS. 7A and 7B are provided merely as an example. Other examples are possible and may differ from what was described with regard to FIGS. 7A and 7B.

Implementations described herein may allow a PCRF to assign ARP levels based on a subscriber class associated with a user device. Furthermore, a base station may manage network congestion using tier-based network resource allocation control based on the assigned ARP levels and/or the network congestion level. In so doing, the base station may allocate network resources to preferred users during periods of congestion.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc. Furthermore, some of these phrases, as used herein, may be used interchangeably.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
   receive, from a user device, a network resource request,
      the network resource request being a request to access a network resource associated with a network;
   determine a service type associated with the network resource request;
   determine a network congestion level associated with the network;
   receive information identifying an allocation and retention priority (ARP) level associated with the network resource request and the user device,
      the ARP level being determined based on a mapping between a plurality of subscriber classes and a corresponding plurality of ARP levels that include the ARP level,
      a subscriber class, of the plurality of subscriber classes, indicating a priority level associated with a user of the user device with respect to allocation of the network resource,
         the subscriber class being mapped to at least two ARP levels of the plurality of ARP levels;
   determine whether the network resource request is to be denied based on the ARP level and the network congestion level; and
   provide the user device with access to the network resource based on determining that the network resource request is to be denied and based on the service type, associated with the network resource request, being a particular service type.

2. The device of claim 1, where the network resource is a first network resource; and
   where the one or more processors are further to:
   determine a plurality of admission thresholds,
      the plurality of admission thresholds being associated with different threshold levels of network congestion; and
   provide the user device with access to a second network resource based on the plurality of admission thresholds.

3. The device of claim 1, where the network resource is a first network resource; and
   where the one or more processors are further to:
   determine that a second network resource is a non-guaranteed bit rate resource;
   determine a non-guaranteed bit rate utilization based on determining that the second network resource is a non-guaranteed bit rate resource; and
   provide the user device with access to the second network resource based on the non-guaranteed bit rate utilization.

4. The device of claim 1, where the network resource is a first network resource; and
   where the one or more processors are further to:
   determine a bearer utilization;
   where the one or more processors, when determining the network congestion level, are to:
      determine the network congestion level based on the bearer utilization; and
   where the one or more processors are further to:
      provide the user device with access to a second network resource based on the bearer utilization.

5. The device of claim 1, where the network resource is a first network resource, the network resource request is a first network resource request, and the ARP level is a first ARP level; and
   where the one or more processors are further to:
   determine a set of ARP levels associated with an admission threshold;
   determine that a second ARP level associated with a second network resource request matches at least one of the set of ARP levels associated with the admission threshold; and
   provide the user device with access to a second network resource based on determining that the second ARP level matches at least one of the set of ARP levels associated with the admission threshold.

6. The device of claim 1, where the network resource is a first network resource; and
   where the one or more processors are further to:
   determine that the user device is undergoing a hand-off from a base station;
   determine that a second network resource request is associated with the user device undergoing the hand-off; and
   provide the user device with access to a second network resource based on determining that the second network resource request is associated with the user device undergoing the hand-off.

7. A method, comprising:
   receiving, by a device, a network resource request, the network resource request corresponding to a request, by a user device, to access a network resource associated with a network;
determining, by the device, a service type associated with the network resource request;
determining, by the device, a network congestion level associated with the network;
providing, by the device, a user device identifier that identifies the user device;
receiving, by the device and based on providing the user device identifier, information identifying a quality of service parameter assigned to the network resource,
the quality of service parameter being determined based on a mapping between a plurality of subscriber classes and a corresponding plurality of quality of service parameters that include the quality of service parameter,
a subscriber class, of the plurality of subscriber classes, indicating a priority level associated with a user of the user device,
the subscriber class being mapped to at least two quality of service parameters of the plurality of quality of service parameters;
determining, by the device, that the network resource request is to be denied based on the quality of service parameter and the network congestion level; and
providing, by the device, the user device with access to the network resource based on determining that the network resource request is to be denied and based on the service type, associated with the network resource request, being a particular service type.

8. The method of claim 7, where receiving the information identifying the quality of service parameter comprises:
receiving information identifying an allocation and retention priority (ARP) parameter value,
the ARP parameter value being determined based on at least one of:
the subscriber class, or
the service type.

9. The method of claim 7, where the network resource is a first network resource; and
where the method further comprises:
determining a plurality of admission thresholds,
the plurality of admission thresholds being associated with different threshold levels of network congestion; and
providing the user device with access to a second network resource based on the plurality of admission thresholds.

10. The method of claim 7, further comprising:
determining that the network resource is a guaranteed bit rate resource; and
determining a guaranteed bit rate utilization based on determining that the network resource is the guaranteed bit rate resource; and
where determining the network congestion level associated with the network comprises:
determining the network congestion level based on the guaranteed bit rate utilization.

11. The method of claim 7, where the network resource is a first network resource and the quality of service parameter is a first quality of service parameter; and
where the method further comprises:
selectively denying the user device access to a second network resource based on the network congestion level and a second quality of service parameter.

12. The method of claim 7, where the user device is a first user device; and
where the method further comprises:
adjusting access to another network resource for a second user device based on receiving the network resource request; and
where providing the user device with access to the network resource comprises:
providing the first user device with access to the network resource based on adjusting access to the other network resource for the second user device.

13. The method of claim 7, where determining the network congestion level comprises:
determining the network congestion level based on at least one of:
a guaranteed bit rate utilization;
a non-guaranteed bit rate utilization;
a bearer utilization;
a physical resource block utilization; or
a quantity of user devices in communication with the device that receives the network resource request.

14. A non-transitory computer-readable medium storing instructions, the instructions comprising:
one or more instructions that, when executed by one or more processors, cause the one or more processors to:
receive information associated with a network resource request,
the network resource request being a request, by a user device, for access to a network resource associated with a network;
determine a subscriber class associated with the user device based on receiving the information associated with the network resource request,
the subscriber class indicating a priority level of a subscriber associated with the user device;
determine a service type associated with the network resource request based on receiving the information associated with the network resource request;
determine an allocation and retention priority (ARP) level based on the service type and based on a mapping between a plurality of subscriber classes and a corresponding plurality of ARP levels,
the plurality of subscriber classes including the subscriber class,
the plurality of ARP levels including the ARP level, and
the subscriber class being mapped to at least two ARP levels included in the plurality of ARP levels;
determine that the network resource request is to be denied based on the ARP level and a network congestion level; and
provide the user device with access to the network resource based on determining that the network resource request is to be denied and based on the service type, associated with the network resource request, being a particular service type.

15. The non-transitory computer-readable medium of claim 14, where the one or more instructions, when executed by the one or more processors, further cause the one or more processors to:
provide information identifying the ARP level; and
where the one or more instructions, that cause the one or more processors to provide the user device with access to the network resource, cause the one or more processors to:

provide the user device with access to the network resource based on providing the information identifying the ARP level.

16. The non-transitory computer-readable medium of claim 15, where the one or more instructions, that cause the one or more processors to provide the information identifying the ARP level, cause the one or more processors to:
provide the information identifying the ARP level to a base station.

17. The non-transitory computer-readable medium of claim 15, where the network resource is a bearer; and
where the one or more instructions, that cause the one or more processors to provide the information identifying the ARP level, cause the one or more processors to:
provide the information identifying the ARP level via the bearer.

18. The non-transitory computer-readable medium of claim 14, where the one or more instructions, when executed by the one or more processors, further cause the one or more processors to:
receive information identifying the user device;
provide the information identifying the user device to another device; and
receive, from the other device, information identifying the subscriber class based on providing the information identifying the user device; and
where the one or more instructions, that cause the one or more processors to determine the subscriber class associated with the user device, cause the one or more processors to:
determine the subscriber class based on receiving the information identifying the subscriber class.

19. The device of claim 1, where the network resource is a first network resources; and
where the one or more processors are further to:
selectively deny the user device access to a second network resource based on the network congestion level and a quality of service parameter.

20. The method of claim 7, where the network resource is a first network resources and the network resource request is a first network resource request and
where the method further comprises:
determining that the user device is undergoing a hand-off from a base station;
determining that a second network resource request is associated with the user device undergoing the hand-off; and
providing the user device with access to a second network resource based on determining that the second network resource request is associated with the user device undergoing the hand-off.

* * * * *